United States Patent
Mihira

(10) Patent No.: US 8,665,475 B2
(45) Date of Patent: Mar. 4, 2014

(54) IMAGE FORMING APPARATUS, INFORMATION PROCESSING APPARATUS, IMAGE FORMING METHOD, AND STORAGE MEDIUM

(75) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 13/281,798

(22) Filed: Oct. 26, 2011

(65) Prior Publication Data

US 2012/0113462 A1  May 10, 2012

(30) Foreign Application Priority Data

Nov. 4, 2010  (JP) ................................ 2010-247864

(51) Int. Cl.
  *G06F 3/12* (2006.01)
  *G06K 15/00* (2006.01)
(52) U.S. Cl.
  USPC ........................................ 358/1.15; 358/1.18
(58) Field of Classification Search
  None
  See application file for complete search history.

(56) References Cited

U.S. PATENT DOCUMENTS

| 7,165,072 B2 * | 1/2007 | Feng et al. ............................ 1/1 |
| 2006/0023238 A1 * | 2/2006 | Blaszyk et al. .............. 358/1.13 |
| 2007/0282827 A1 * | 12/2007 | Levin ................. 707/5 |
| 2011/0013209 A1 * | 1/2011 | Yamazaki ...................... 358/1.9 |
| 2012/0194860 A1 * | 8/2012 | Anno .......................... 358/1.15 |

FOREIGN PATENT DOCUMENTS

| JP | 2008-217060 A | 9/2008 |
| JP | 2009181416 A * | 8/2009 |

* cited by examiner

*Primary Examiner* — Dov Popovici
(74) *Attorney, Agent, or Firm* — Canon USA, Inc., IP Division

(57) ABSTRACT

An image forming apparatus, which is capable of effectively performing a test print with the number of records being smaller than that of all records of variable data printing VDP, receives a VDP job including a plurality of records, extracts records by deleting items in which different values are set to all records among the items which are set to the plurality of records included in the VDP job and used for printing and by combining records which have the same combination of values set to remaining items by an extraction unit, receives an test print instruction, and prints the records which the extraction unit extracts according to the test print instruction.

17 Claims, 15 Drawing Sheets

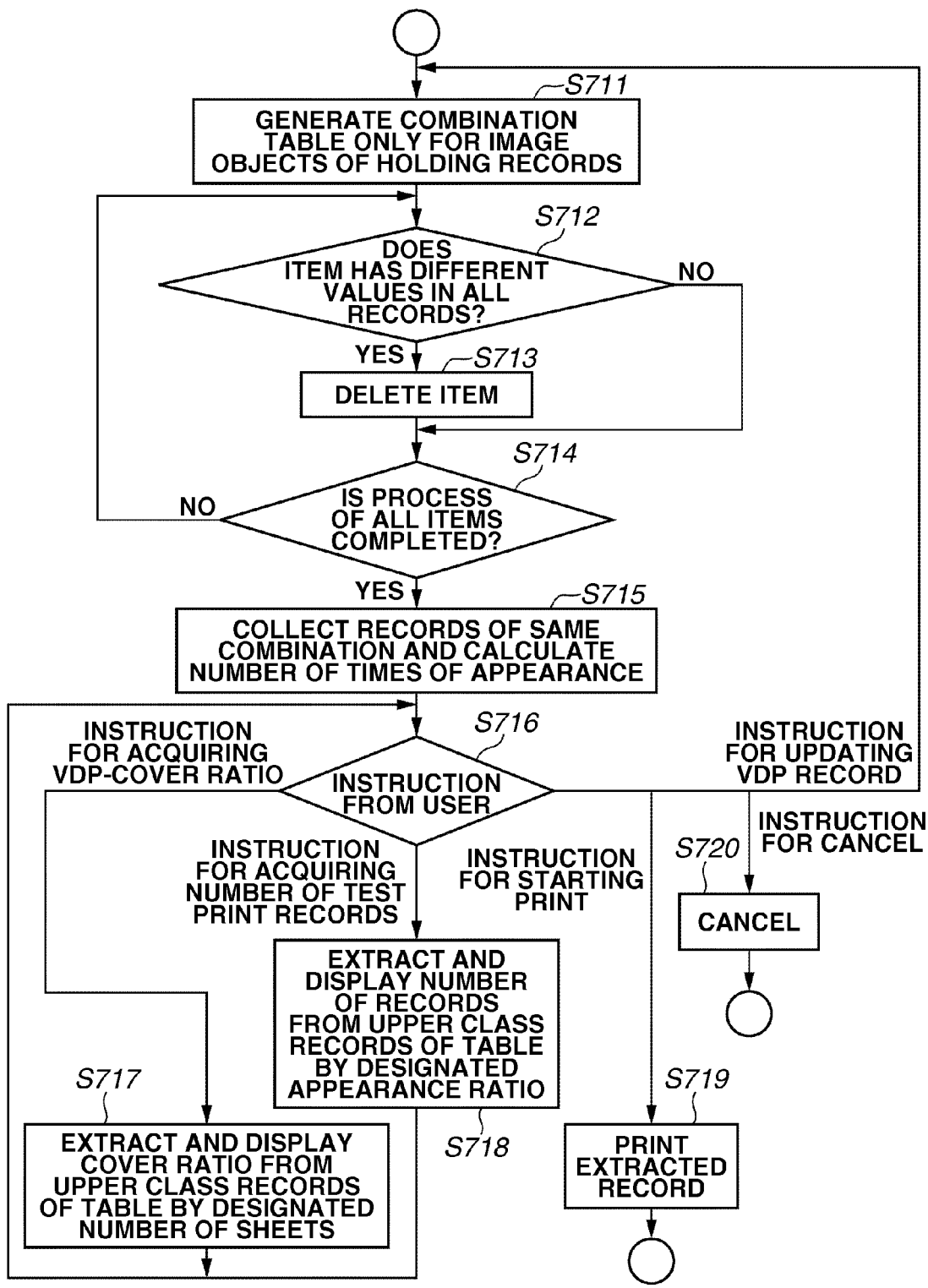

FIG.8
TABLE OF VDP VARIABLE DATA

| RECORD | NAME | PHOTO | GENDER | IMAGE A | PAPER | HOBBY | IMAGE B |
|---|---|---|---|---|---|---|---|
| 1 | A | 0001.jpg | MALE | MALE.JPG | BLUE | CAR | Car.JPG |
| 2 | B | 0002.jpg | FEMALE | FEMALE.JPG | PINK | CAR | Car.JPG |
| 3 | C | 0003.jpg | MALE | MALE.JPG | BLUE | CAR | Car.JPG |
| 4 | D | 0004.jpg | MALE | MALE.JPG | BLUE | TENNIS | Tennis.JPG |
| 5 | E | 0005.jpg | MALE | MALE.JPG | BLUE | TENNIS | Tennis.JPG |
| 6 | F | 0006.jpg | FEMALE | FEMALE.JPG | PINK | TENNIS | Tennis.JPG |
| 7 | G | 0007.jpg | FEMALE | FEMALE.JPG | PINK | CAR | Car.JPG |
| 8 | H | 0008.jpg | MALE | MALE.JPG | BLUE | TENNIS | Tennis.JPG |

FIG.10

TABLE OF VDP VARIABLE DATA

| RECORD | PHOTO | IMAGE A | PAPER | IMAGE B |
|---|---|---|---|---|
| 1 | 0001.jpg | MALE.JPG | BLUE | Car.JPG |
| 2 | 0002.jpg | FEMALE.JPG | PINK | Car.JPG |
| 3 | 0003.jpg | MALE.JPG | BLUE | Car.JPG |
| 4 | 0004.jpg | MALE.JPG | BLUE | Tennis.JPG |
| 5 | 0005.jpg | MALE.JPG | BLUE | Tennis.JPG |
| 6 | 0006.jpg | FEMALE.JPG | PINK | Tennis.JPG |
| 7 | 0007.jpg | FEMALE.JPG | PINK | Car.JPG |
| 8 | 0008.jpg | MALE.JPG | BLUE | Tennis.JPG |

FIG.11
TABLE OF VDP VARIABLE DATA

| RECORD | IMAGE A | PAPER | IMAGE B | NUMBER OF TIMES OF APPEARANCE | RATE OF APPEARANCE |
|---|---|---|---|---|---|
| 4 | MALE.JPG | BLUE | Tennis.JPG | 3 | 37% |
| 1 | MALE.JPG | BLUE | Car.JPG | 2 | 25% |
| 2 | FEMALE.JPG | PINK | Car.JPG | 2 | 25% |
| 6 | FEMALE.JPG | PINK | Tennis.JPG | 1 | 12% |

IMAGE FORMING APPARATUS, INFORMATION PROCESSING APPARATUS, IMAGE FORMING METHOD, AND STORAGE MEDIUM

BACKGROUND OF THE INVENTION

1. Field of the Invention

The present invention relates to an image forming apparatus, an information processing apparatus, an image forming method, and a storage medium in a variable data printing (VDP) system.

2. Description of the Related Art

In recent years, an image forming apparatus capable of printing a large number of copies at a high speed has been developed. A digital technique has been introduced to a printing control for the image forming apparatus to facilitate printing different for each copy of printed products. Along with that, direct mail has been conventionally printed by offset printing, but now it is printed by an image forming apparatus using digital techniques.

Printing direct mail by the image forming apparatus enables producing and sending an individual printing for each individual being an addressee. For example, according to the gender of an addressee, a drawing pattern to be printed is changed, and/or the color of paper is changed. Information about a commercial product recommended to a customer of the addressee can be printed based on a history indicating that the addressee has purchased commercial products in the past.

A technique for that purpose includes a VDP technique. In the VDP, print design data being basics are generated. The generated design data includes a variable portion and a proper portion. Information suited for each addressee is put into the variable portion based on data extracted from a customer information database (DB) and printing is performed. For example, a product image suitable for a name of each addressee and past information about the purchase of each addressee can be put into the variable portion. The use of the VDP technique allows more effective direct mail to be printed and produced.

VDP printing is directed to a large number of addressees on an order of ten thousand addressees. For that reason, it is unrealistic to confirm whether each printed product achieves the expected result by separately printing or previewing. As a technique for that purpose, Japanese Patent Application Laid-Open No. 2008-217060 discusses a technique which automatically determines whether an image is tolerable for printing in consideration of the resolution of an object at the time of printing variable data in the VDP printing.

In the conventional technique, if a VDP test print is executed to confirm the combination of objects such as a figure and a picture used for VDP, all records need to be printed. This causes a problem that a very large number of sheets need to be printed for the test print and a burden required for a user to make confirmation is large.

SUMMARY OF THE INVENTION

The present invention is directed to a printing system capable of effectively performing a test print with the number of records being smaller than that of all records for VDP.

According to an aspect of the present invention, an image forming apparatus includes a reception unit configured to receive a VDP job including a plurality of records, a storage unit configured to store a combination of values of records obtained by deleting items in which different values are set to all records among the items which are set to a plurality of records included in the VDP job and used for printing and by combining records which have the same combination of values set to the remaining items, and a printing unit configured to print the records based on the combination stored by the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a detail flowchart of a test print of the VDP test print application operating on the image forming apparatus.

FIG. 8 illustrates an example of a table for variable data of the VDP job processed by the VDP test print application.

FIG. 10 is an example of a table for variable data of the VDP job in step S714 processed by the VDP test print application.

FIG. 11 is an example of a table for variable data of the VDP job in step S715 processed by the VDP test print application.

DESCRIPTION OF THE EMBODIMENTS

Various exemplary embodiments, features, and aspects of the invention will be described in detail below with reference to the drawings.

The exemplary embodiments for executing the present invention are described below with reference to drawings. The components according to the following exemplary embodiments are merely examples and the scope of the present invention is not limited only to the exemplary embodiments.

Figure 1:
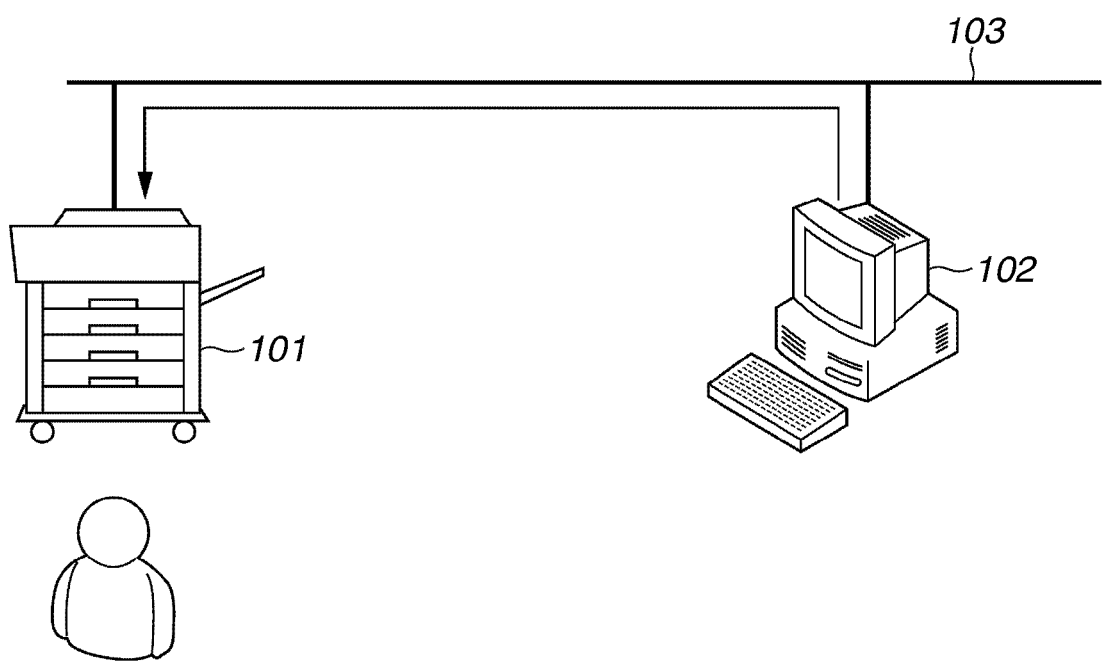
FIG. 1 is a schematic diagram illustrating a basic configuration of a printing system applied to a first exemplary embodiment of the present invention.

FIG. 1 is a schematic diagram illustrating a configuration of a printing system applied to a first exemplary embodiment of the present invention.

An image forming apparatus 101 is capable of receiving a VDP job from a client PC 102 via a network 103. The image forming apparatus 101 can analyze and print the received VDP job.

The client PC 102 is an information processing apparatus having a function to transmit the VDP job to the image forming apparatus 101. The network 103 is the one for connecting the image forming apparatus 101 with the client PC 102. The network 103 is the one for realizing a local area network (LAN) connection such an Ethernet network, for example.

Figure 2:
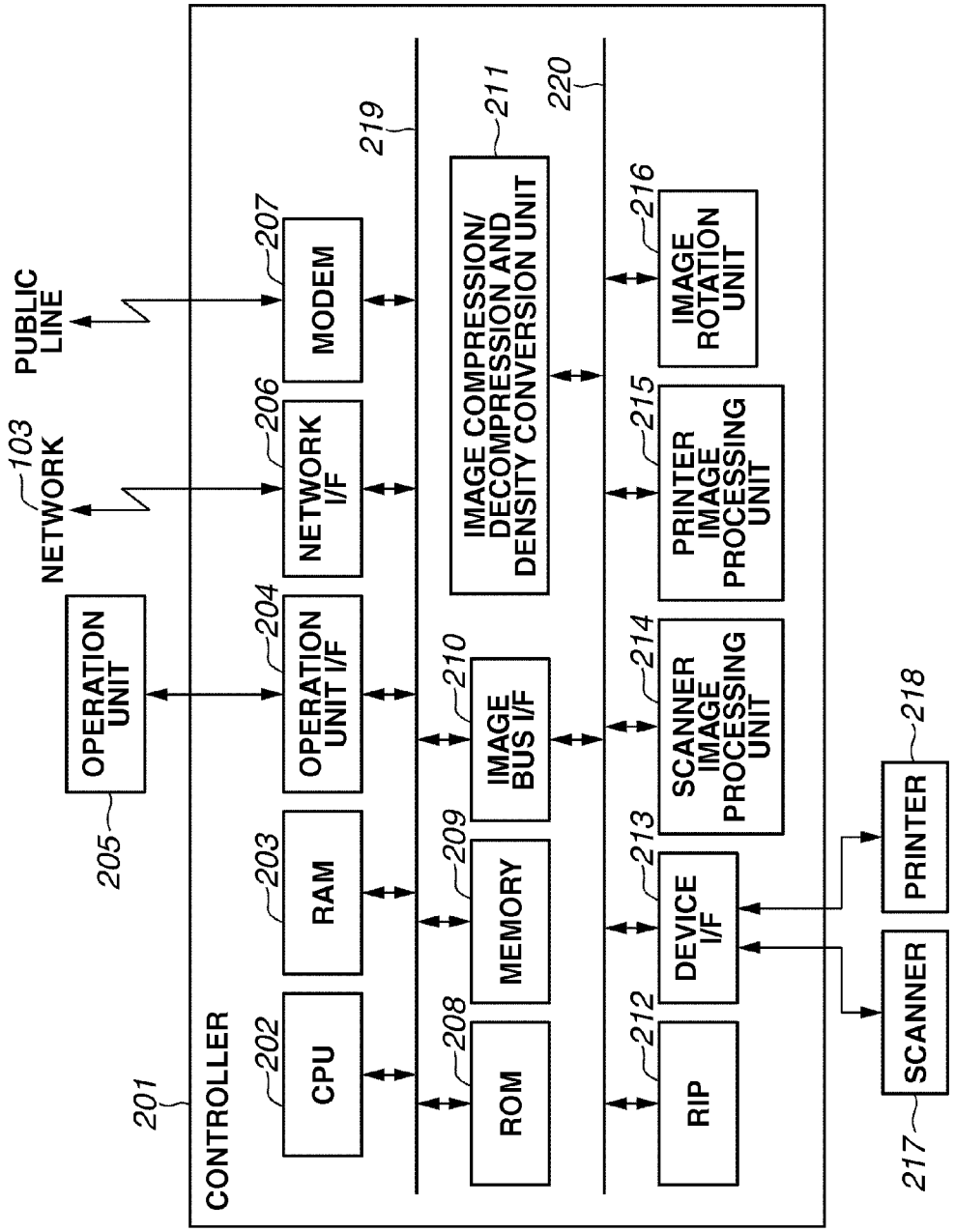
FIG. 2 is a block diagram illustrating a hardware configuration of an image forming apparatus in FIG. 1.

FIG. 2 is a block diagram illustrating an outline of hardware configuration of the image forming apparatus 101.

The image forming apparatus 101 includes a controller 201, an operation unit 205, a scanner 217, and a printer 218.

The operation unit 205 displays a screen for a user of the image forming apparatus 101 according to the instruction of the controller 201 and plays a role of transferring instruction from the user to the controller 201. The scanner 217 plays a role as an image input device which reads an image of a document and inputs image data. The printer 218 performs a printing process and acts as an image output device.

The controller 201 is connected with the scanner 217 and the printer 218. The controller 201 communicates with the client PC 102 via the network 103 illustrated in FIG. 1. The controller 201 is thus connected with various apparatuses to control input and output of image information and device information.

The controller 201 is described in detail below.

A central processing unit (CPU) 202 is a controller for controlling the entire system in the image forming apparatus 101. A random access memory (RAM) 203 is a system work memory for operating the CPU 202 and an image memory for temporarily storing image data. A read only memory (ROM) 208 is a boot ROM which stores a boot program for the system of the image forming apparatus 101.

Figure 3:
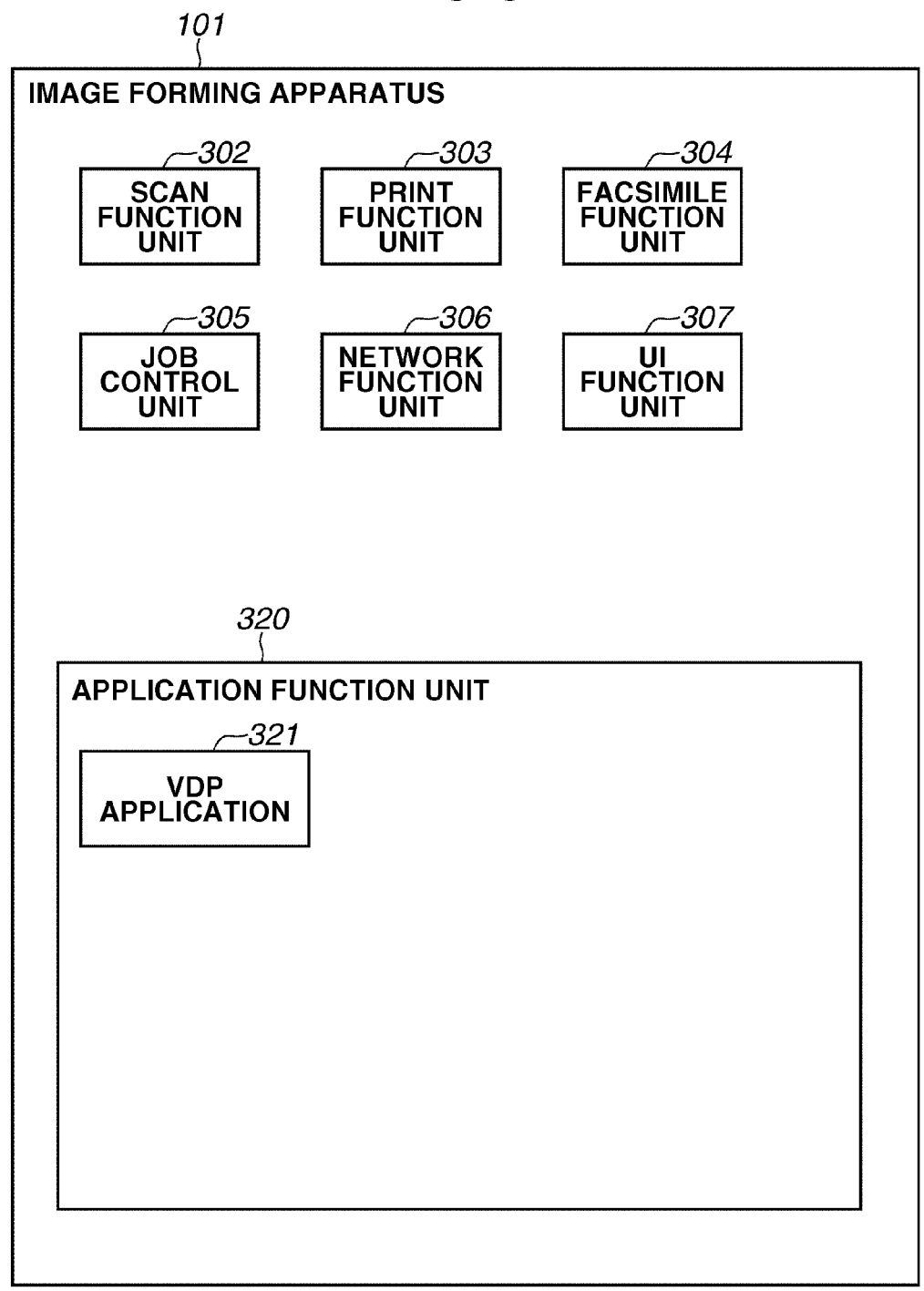
FIG. 3 is a block diagram illustrating a software configuration of the image forming apparatus in FIG. 1.

A memory 209 is a hard disk drive in the image forming apparatus 101 and stores system software, application software, and image data illustrated in FIG. 3. An area for storing the image data in the memory 209 stores the VDP job received from the client PC 102 and an analysis result of the VDP job.

An operation unit interface (I/F) 204 is an interface unit with an operation unit 205 and outputs image data to be displayed on the operation unit 205 to the operation unit 205. The operation unit I/F 204 has a function to transmit information input by the user of the image forming apparatus 101 via the operation unit 205 to the CPU 202.

A network I/F 206 is connected to the network 103 and inputs and outputs information. The modem 207 is connected to a public line (not illustrated) and inputs and outputs information. The above devices are arranged on a system bus 219.

An image bus I/F 210 is a bus bridge for converting data structure and is connected with the system bus 219 and an image bus 220 for transferring image data at a high speed. The image bus 220 is comprised of a peripheral component interconnect (PCI) bus or Institute of Electrical and Electronics Engineers (IEEE) 1394. On the image bus 220 are arranged a raster image processor (RIP) 212, a device I/F 213, a scanner image processing unit 214, a printer image processing unit 215, an image rotation unit 216, and an image compression/decompression and density conversion unit 211.

The RIP 212 rasterizes a page description language (PDL) code to a bit map image. The device I/F 213 connects the scanner 217 and the printer 218 with the controller unit 201.

The scanner image processing unit 214 subjects image data input from the scanner 217 to correction, processing, and editing.

The printer image processing unit 215 subjects image data to be output to the printer 218 to print correction and resolution conversion. The image rotation unit 216 rotates image data. The image compression/decompression and density conversion unit 211 converts multivalued image data into joint photographic experts group (JPEG) data and subjects binary image data to compression/decompression processing of joint bi-level image experts group (JBIG), modified READ (MMR), or modified Huffman (MH).

FIG. 3 is a block diagram describing the software function of the image forming apparatus 101.

Each software in FIG. 3 is stored in the memory 209 and executed by the CPU 202, both of which are illustrated in FIG. 2.

A scan function unit 302 has a function to read a paper document to convert the document into binary or multivalued image data using the scanner 217. A print function unit 303 has a function to output the image which is read and converted into the image data by the scan function unit 302 to the printer 218 with a command for the printer 218 added thereto.

A facsimile function unit 304 codes the image, which is read and converted into the image data by the scan function unit 302, according to facsimile standards such as Group 3 and 4 protocols. The facsimile function unit 304 has a function to perform image communication with an external facsimile apparatus in accordance with the protocol conforming to the facsimile standards using the modem 207. Furthermore, the facsimile function unit 304 has a function to transmit and receive facsimile image to and from the external facsimile apparatus via the modem 207 according to the facsimile standards.

A job control function unit 305 queues image data received from the scan function unit 302 and facsimile image data externally received by the facsimile function unit 304 as a print job. The job control function unit 305 appropriately outputs the image data to the print function unit 303, the facsimile function unit 304, and a network function unit 306 described below.

The network function unit 306 includes various network protocol functions such as transmission control protocol/internet protocol (TCP/IP), hypertext transfer protocol (HTTP), file transfer protocol (FTP), lightweight directory access protocol (LDAP), simple network management protocol (SNMP), simple mail transfer protocol (SMTP), secure sockets layer (SSL), and server message block (SMB). For example, the network function unit 306 receives the VDP job from the client PC 102 via the network I/F 206.

A UI function unit 307 manages inputting and outputting by the user via the operation unit 205 of the image forming apparatus 101. The UI function unit 307 displays an input field and an output message field on the operation unit 205, receives an input value for the input field from the user, and notifies other function units of the input value. The UI function unit 307 has a function to display a message for the user from other function units on a previously designed screen.

An application function unit 320 has a function to install, execute, and uninstall various applications operating on the image forming apparatus 101. A VDP application 321 is one of the applications of the image forming apparatus 101 operating on the application function unit 320. The VDP application 321 receives the VDP job transmitted from the client PC 102 via the network function unit 306 and performs the print processing of the VDP job.

Figure 4:
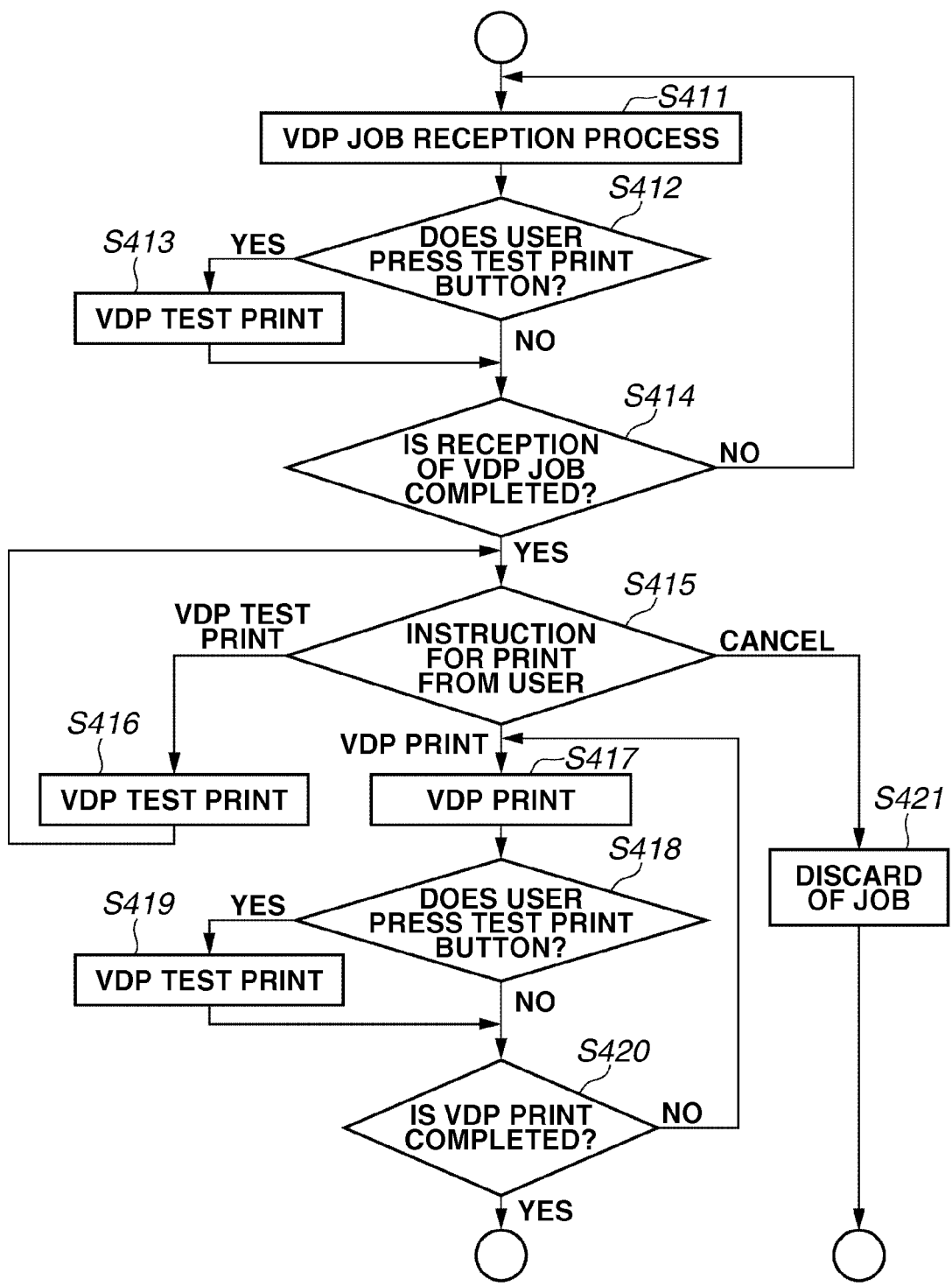
FIG. 4 is a general flowchart illustrating a VDP test print application operating on the image forming apparatus.

Processing is described below in which the image forming apparatus 101 prints the VDP job transmitted from the client PC 102. FIG. 4 is a flowchart illustrating a series of processing such as the reception of the VDP job, a test print, and a VDP print.

Figure 5:
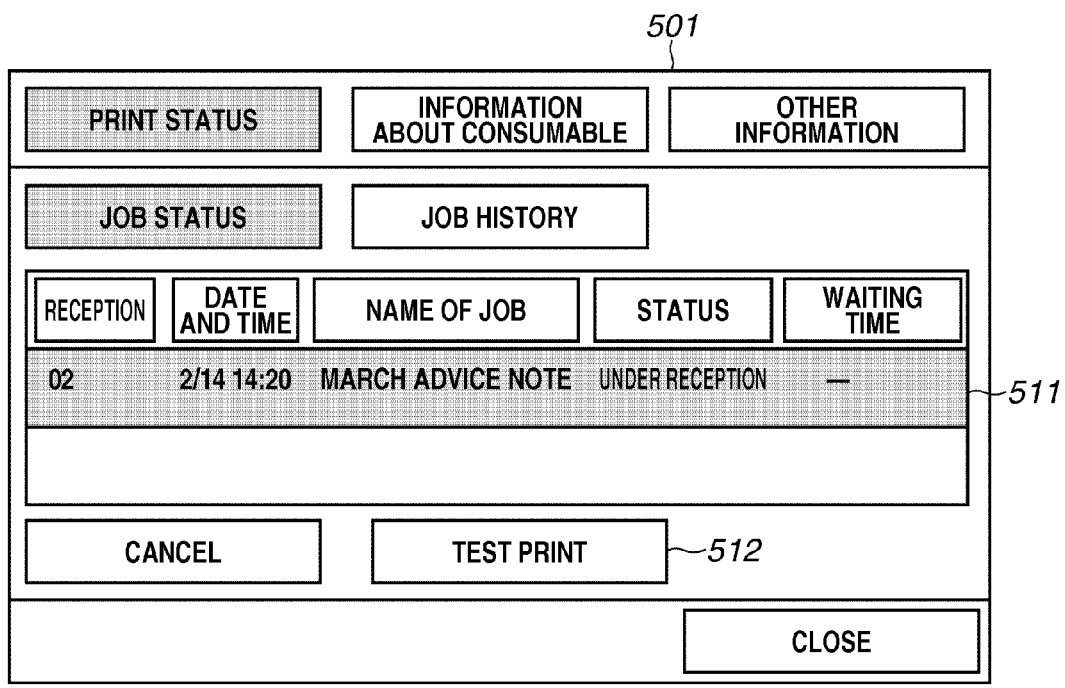
FIG. 5 is a user interface (UI) of a job status (S412) of the operation unit of the image forming apparatus.

In step S411, when the VDP job is received from the client PC 102, the VDP application 321 operating on the controller 201 performs reception processing via the network function unit 306. While the VDP application 321 is receiving job data, the VDP application 321 displays a job status screen 501 illustrated in FIG. 5 on the operation unit 205 using the UI function unit 307. In the figure, such a status is supposed that the user selects a VDP job 511 under reception and a test print button 512 is pressed.

In step S412, the VDP application 321 determines whether the user presses the test print button 512. If the VDP application 321 determines that the user presses the test print button 512 (YES in step S412), in step S413, the VDP application 321 executes VDP test print processing. The VDP test print processing in step S413 is described in detail below with reference to a flowchart illustrated in FIG. 7.

The processing permits the execution of the VDP test print even while the VDP job is being received. If the VDP application 321 determines that the user does not press the test print button 512 (NO in step S412), in step S414, the VDP application 321 determines whether the reception of the VDP job is completed. If the reception of the VDP job is not yet completed (NO in step S414), the processing returns to the VDP job reception processing in step S411 to continue the reception.

Figure 6:
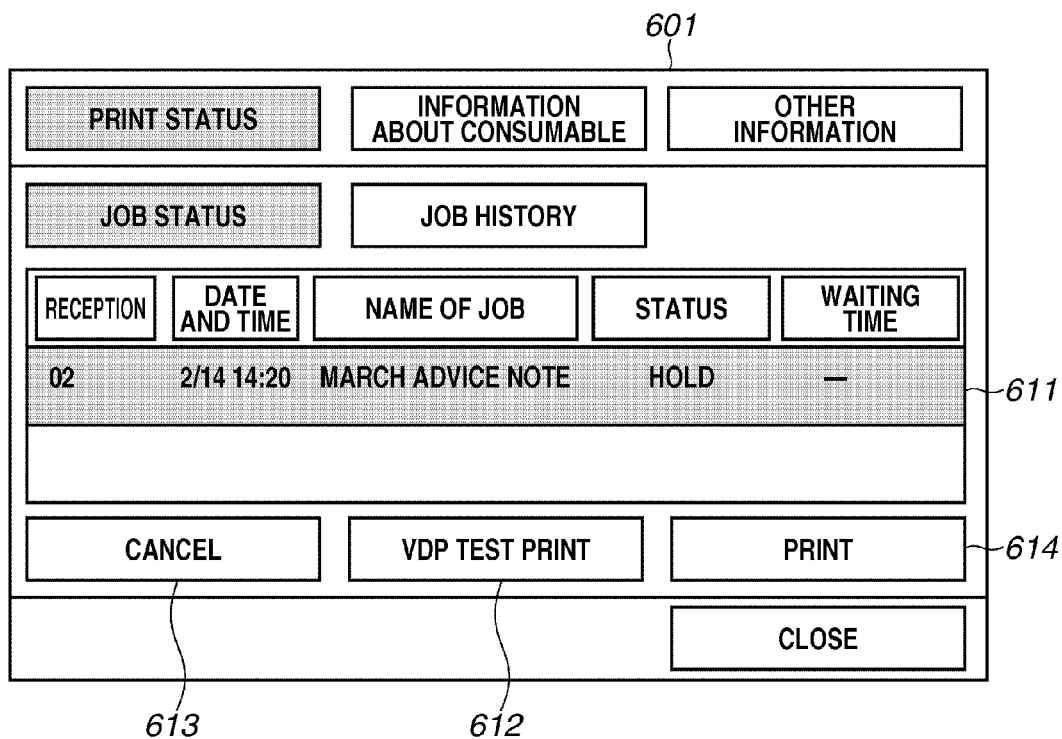
FIG. 6 is a UI of a print instruction (S415) of the operation unit of the image forming apparatus.

If the reception of the VDP job is completed (YES in step S414), in step S415, the VDP application 321 displays a job status screen 601, as illustrated in FIG. 6, which indicates that the reception of job data is completed on the operation unit 205 using the UI function unit 307 and waits for instruction from the user.

When the user presses a VDP test print button 612, in step S416, the VDP application 321 performs the VDP test print processing. After the VDP test print processing is ended, the VDP application 321 waits for instruction from the user. The VDP test print processing in step S416 is described in detail below with reference to a flowchart illustrated in FIG. 7.

When the user presses a print button 614, in step S417, the VDP application 321 performs VDP print processing. As is the case with the VDP job being received in step S411, such a status is supposed that the user selects a VDP job 511 under reception while print processing is being performed in step S417 and presses the test print button 512.

In step S418, the VDP application 321 determines whether the user presses the test print button 512. If the user presses the test print button 512 (YES in step S418), in step S419, the VDP application 321 executes VDP test print processing. The VDP test print processing in step S419 is described in detail below with reference to a flowchart illustrated in FIG. 7. This processing enables the execution of the VDP test print even while the VDP print is being performed.

If the user does not press the test print button 512 (NO in step S418), in step S420, the VDP application 321 determines whether the print of the VDP job is completed. If the print of the VDP job is not yet completed (NO in step S420), the processing returns again to the VDP print in step S417 and reception is continued. If the print of the VDP job is completed (YES in step S420), the processing is ended.

When the user presses a cancel button 613, in step S421, the VDP application 321 discards the job without printing.

The processing of the VDP test print (in S413, S416, and S419) in the flowchart illustrated in FIG. 4 is described in detail below with reference to the flowchart in FIG. 7. Step S413 is different from steps S416 and S419 in that in step S413 only the VDP job record received until that point is subjected to the following extraction processing.

VDP variable data as an example of the VDP job and an example where the first record of the VDP job is printed are described below with reference to FIGS. 8 and 9.

FIG. 8 illustrates an example of a table for VDP variable data of the VDP job applied to the present exemplary embodiment.

"Record" is an item indicating a plurality of record-numbers included in the VDP job. A serial number starting with one is provided for each record. The record is used for identifying individual records. "Name" is an item indicating the name of a customer being an addressee. As a portion 911 illustrated in FIG. 9, the name of each customer is printed for each record.

"Photo" is an item indicating the photo of each customer. As a portion 912 illustrated in FIG. 9, the photo is printed next to the name. "Gender" is an item indicating the gender of each customer. "Image A" is an item indicating the kind of an image object used in printing and a gender-oriented image is printed based on information about the gender.

Figure 9:
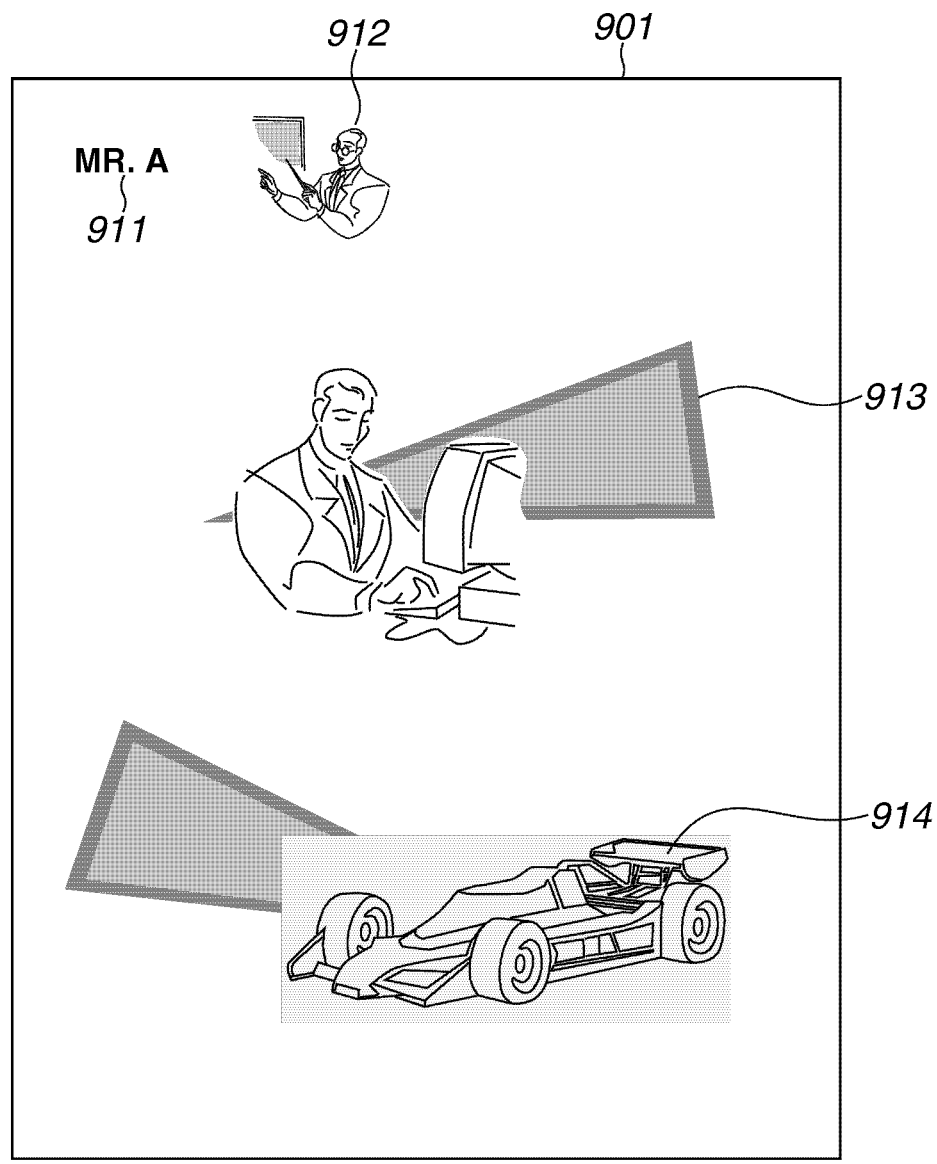
FIG. 9 is an example of print of the VDP job processed by the VDP test print application.

In FIG. 9, the gender of the record 1 is a male, so that a figure 913 for a male (male.JPG) is printed. If the gender of a target record is a female, another figure (female.JPG) is printed (not illustrated).

"Paper" is an item indicating the kind of paper used for printing. Based on the gender information, a blue paper is used for a print for a male, and a pink paper is used for a print for a female. "Hobby" is an item indicating information about the hobby of each customer. "Image B" is an item indicating the kind of an image object used in printing. An image suited for the hobby information is used for printing.

In FIG. 9, the hobby of the record 1 is a car, so that the figure of a car 914 (Car.JPG) is printed.

The steps of the flowchart in FIG. 7 are caused to proceed, with reference to the data in FIG. 8, to realize the test print.

In step S711, the VDP application 321 generates a table of a combination of an image object and a print appearance which are used in each record from the variable data of the VDP job. As a result, as illustrated in FIG. 10, a data table including "photo", "Image A", "paper", and "Image B" is generated.

In steps S712 to S714, for each item of the data table generated in step S711, the VDP application 321 deletes an item having different values in all records. In step S712, the VDP application 321 determines whether an item to be determined has different values in all records included in the data table.

In the case of FIG. 10, the values of the item "photo" are different from one another in all records, so that the VDP application 321 determines that the item has different values in all records included in the data table in step S712. If the VDP application 321 determines that the item has different values in all records included in the data table (YES in step S712), in step S713, the VDP application 321 deletes the item to be determined from the data table.

If the VDP application 321 determines that the item does not have different values in all records included in the data table (NO in step S712), the processing proceeds to step S714 without the item being deleted. In step S714, the VDP application 321 determines whether all items are determined in step S712. If all items are not determined (NO in step S714), an item to be determined is changed and the processing proceeds to step S712. If all items are determined (YES in step S714), the processing proceeds to step S715.

After the item is deleted, in step S715, the VDP application 321, in the data table in which the item is deleted, collects the records which have the same combination of values of each item and calculates the number of times of appearance and the rate of appearance of each combination.

More specifically, in the case of FIG. 10, the records 4, 5, and 8 include "male.JPG" in the value of "Image A", "blue" in the value of "paper", and "Tennis.JPG" in the value of "Image B", and all values of each item are the same.

For that reason, as illustrated in the record 4 of FIG. 11, the same records can be collected as one combination. Similarly, the records 1 and 3 and the records 2 and 7 can be collected as one combination, respectively. At this point, as illustrated in FIG. 11, the record 4 is a representative of the records 4, 5, and 8.

In the present exemplary embodiment, as a method for determining a typical record, the record whose record number is the lowest in the collected records is taken as a typical record. However, the present exemplary embodiment is not limited to this method.

The number of times of appearance and the rate of appearance of each combination are calculated. For example, the combination typified by the record 4 appears three times as the records 4, 5, and 8. Then, the rate of appearance in all records is 37%.

Figure 12:
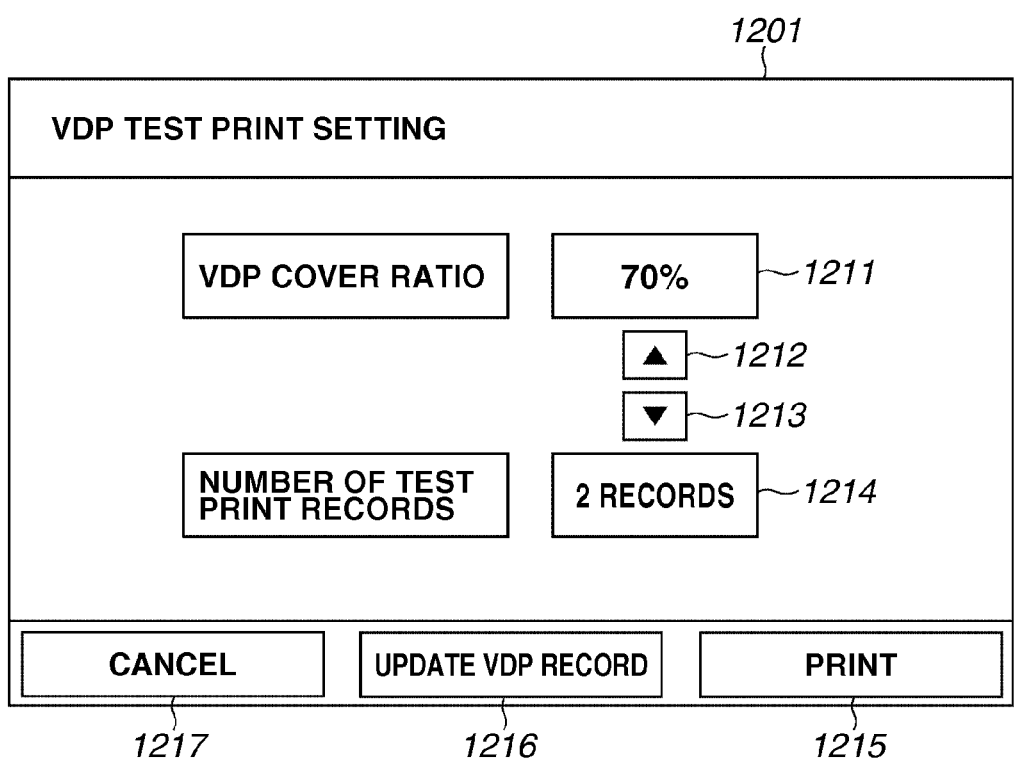
FIG. 12 illustrates an example of a UI screen of print instruction (S716) of an operation unit 205 of the image forming apparatus.

In step S716, the VDP application 321 displays a test print setting screen 1201 illustrated in FIG. 12 on the operation unit 205, waits for an instruction from the user, and determines the contents of the user's instruction received via the test print setting screen 1201. FIG. 12 illustrates an example of the test print setting screen 1201 displayed on the operation unit 205 in step S716.

The user can enter instructions into the test print setting screen 1201 to cancel the test print, to update a VDP record, to start printing, to acquire a VDP cover ratio, and to acquire the number of test print records.

An instruction to cancel is one for cancelling the test print. Pressing a cancel button 1217 issues the instruction. An instruction to update the VDP record is one for updating the VDP record and generating again a record table for the test print. Pressing an update VDP record button 1216 issues the instruction.

The instruction to update the VDP record is the one for performing the test print in consideration of the rest of records of the VDP job received after the test print is performed in FIG. 7 while the VDP job is being received in step S411.

An instruction to start printing is one for starting the test print. Pressing a print start button 1215 issues the instruction.

An instruction to acquire a VDP cover ratio is one for acquiring the VDP cover ratio indicating that a combination of records to be printed accounts for what percentage of the total records in a case where the number of records displayed on a display area 1214 for the number of test print records is test-printed. Pressing a VDP cover ratio acquisition button 1212 issues the instruction to acquire a VDP cover ratio. An acquisition result is displayed on a VDP cover ratio display area 1211.

An instruction to acquire the number of test print records is one for acquiring the number of records to be printed in a case where the test print is performed to satisfy the VDP cover ratio displayed on the VDP cover ratio display area 1211. Pressing an acquisition button 1213 for the number of test print records issues the instruction to acquire the number of test print records. An acquisition result is displayed on the display area 1214 for the number of test print records.

Any value may be input to the VDP cover ratio display area 1211 and the display area 1214 for the number of test print records. The user inputs a value to the VDP cover ratio display area 1211 to perform an instruction regarding the VDP cover ratio. The user inputs a value to the display area 1214 for the number of test print records to perform an instruction regarding the number of records.

The initial value of the VDP cover ratio display area 1211 is set to 100%. As the initial value of the display area 1214 for the number of test print records, the number of records to be test-printed is input when the VDP cover ratio of 100%. For example, if the VDP data in FIG. 8 is targeted, the number of all combinations is four as illustrated in FIG. 11, so that the initial value of the display area 1214 for the number of test print records is four records.

In step S716, if the VDP application 321 determines that the instruction about the acquisition of a VDP cover ratio is issued, in step S717, the VDP application 321 calculates the VDP cover ratio according to the number of records displayed on the display area 1214 for the number of test print records and displays the VDP cover ratio on the VDP cover ratio display area 1211.

For example, as illustrated in FIG. 12, when the display area 1214 for the number of test print records displays "2 records", two records (i.e., the record 4 and the record 1) are selected from the combinations in descending order of appearance rate (i.e., in descending order of the number of times of appearance) in the table in FIG. 11. The appearance rates (37% and 25%) of the selected records are summed up and a resultant 62% is acquired as the VDP cover ratio to be displayed on the VDP cover ratio display area 1211.

In step S716, if the VDP application 321 determines that the instruction to acquire the number of test print records is issued, the VDP application 321 calculates the number of test print records according to the VDP cover ratio displayed on the VDP cover ratio display area 1211. In step S718, the VDP application 321 displays the calculated number of test print records on the display area 1214 for the number of test print records.

For example, as illustrated in FIG. 12, if the VDP cover ratio display area 1211 reads "70%", the higher appearance rates of the combinations (i.e., the larger number of times of appearance) in FIG. 11 are sequentially summed up until the appearance rates exceed "70%".

Herein, the appearance rates of the three records (i.e., the records 4, 1, and 2) are summed up to get 87%, exceeding 70%, so that the number of test print records is three. Such result is displayed on the display area 1214 for the number of test print records.

In step S716, if the VDP application 321 determines that the instruction to update the VDP record is issued, the VDP application 321 acquires again the VDP data and repeats the processing starting in step S711. In step S716, if the VDP application 321 determines that the instruction to cancel is issued, the VDP application 321 cancels the VDP test print processing and, in step S720, ends the processing.

In step S716, if the VDP application 321 determines that the instruction to start printing is issued, in step S719, the VDP application 321 causes the printer 218 to execute the VDP test print. In the VDP test print, the records whose number is equal to the number of test print records displayed on the display area 1214 for the number of test print records are printed in descending order of the number of times of appearance (i.e., in descending order of the appearance rate) among the extracted typical records as illustrated in the table in FIG. 11.

Thus, the test print of the VDP job can be realized. Even if the number of combination patterns of each object is large, the number of print records can be specified from the cover ratio or the number of test print records. Accordingly, a realistic test print can be easily realized for the VDP job having about ten thousand records.

When a typical record is printed in the VDP test print processing, the VDP application 321 may cause the printer 218 to print information indicating that which record has the same combination on the margin of a page or the other side thereof. This makes it clear that which record is associated with the result of each test print.

That enables a defective VDP record to be quickly detected and a modification work to be facilitated if a VDP job is desired to be modified. The information to be printed indicating that which record has the same combination refers to, for example, the record number and the variable data information (name, photo file name, and gender) of each record illustrated in FIG. 8.

A second exemplary embodiment of the present invention is described below with reference to drawings. The components described in the following exemplary embodiment are merely examples and the scope of the present invention should not be limited only to the components.

Figure 13:
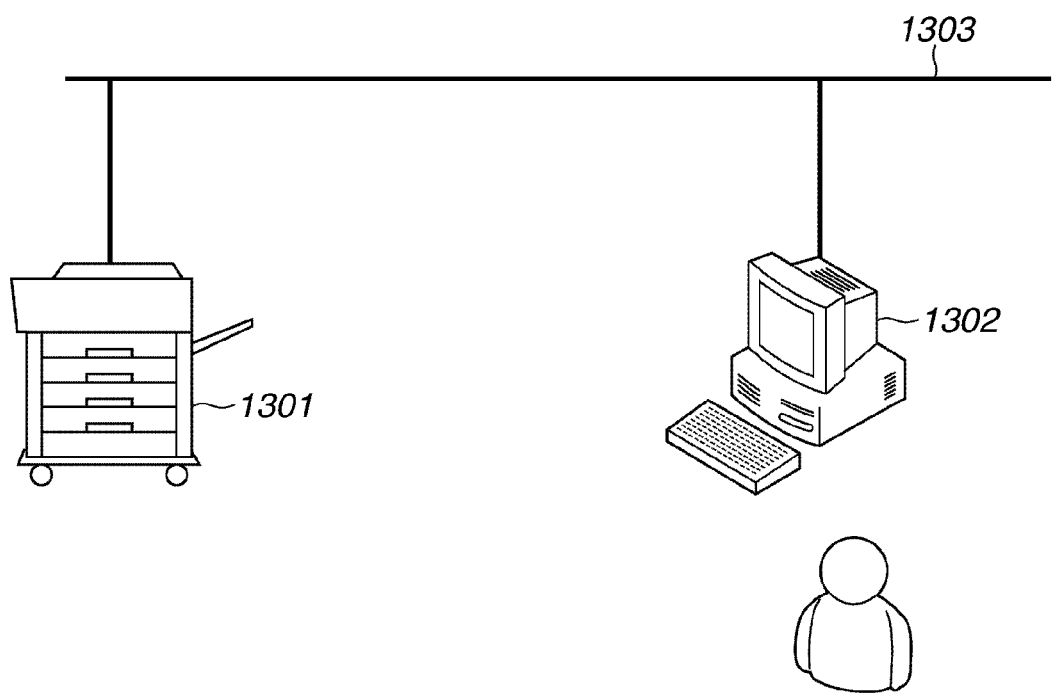
FIG. 13 is schematic diagram illustrating a basic configuration of a print system applied to a second exemplary embodiment of the present invention.

FIG. 13 is a schematic diagram illustrating a basic system configuration applied to the present exemplary embodiment.

An image forming apparatus 1301 is capable of receiving a VDP job from a client PC 1302 via a network 1303. The image forming apparatus 1301 can analyze and print the received VDP job.

The client PC 1302 is the one for transmitting the VDP job to the image forming apparatus 1301. The VDP job can be generated on the client PC 1302 and a VDP application having a VDP test print function described below is operated thereon.

The network 1303 is the one for connecting the image forming apparatus 1301 with the client PC 1302. The network 1303 is the one for realizing a LAN connection such an Ethernet (registered trademark) network, for example.

Figure 14:
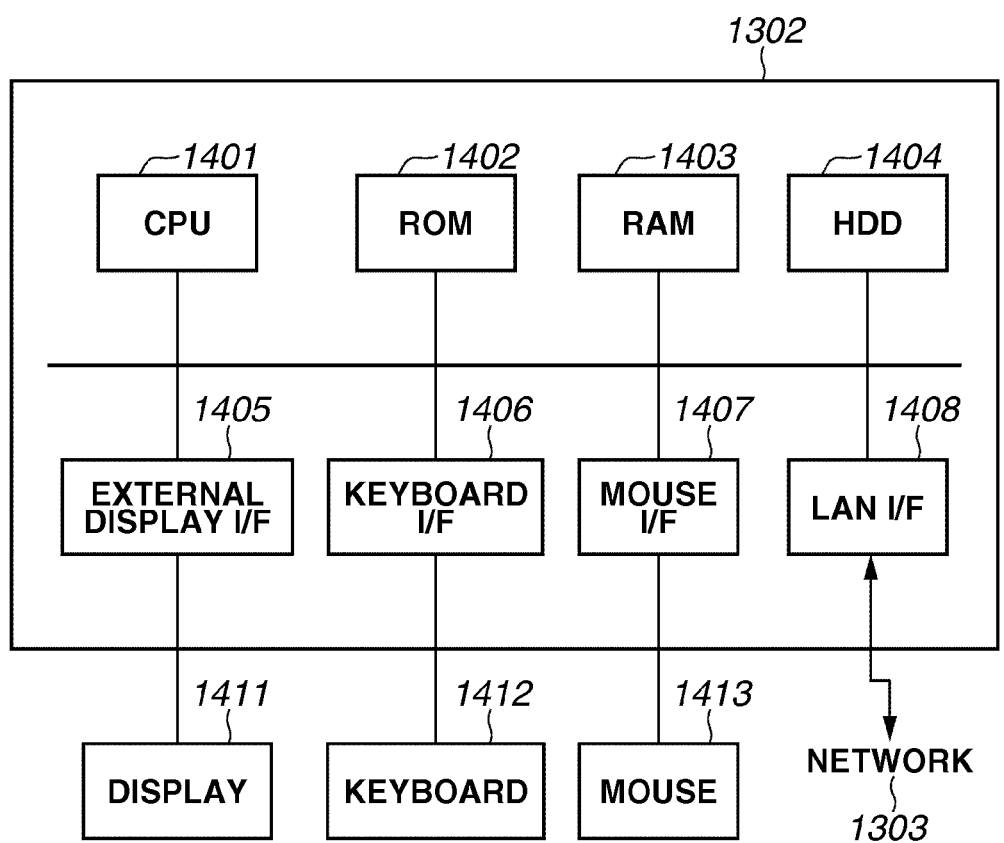
FIG. 14 is a block diagram illustrating the hardware configuration of the client personal computer (PC) illustrated in FIG. 13.

FIG. 14 is a block diagram illustrating an outline of hardware configuration of the client PC 1302 to which the present invention described in FIG. 13 can be applied.

In the present specification, the client PC 1302 includes a CPU 1401, a ROM 1402, a RAM 1403, an HDD 1404, an external display I/F 1405, a keyboard I/F 1406, a mouse I/F 1407, and an LAN I/F 1408.

The client PC 1302 is connected with the network 1303 via the LAN I/F 1408. The print job generated by the VDP application can instruct the image forming apparatus 1301 to execute printing via the network 1303.

Figure 15:
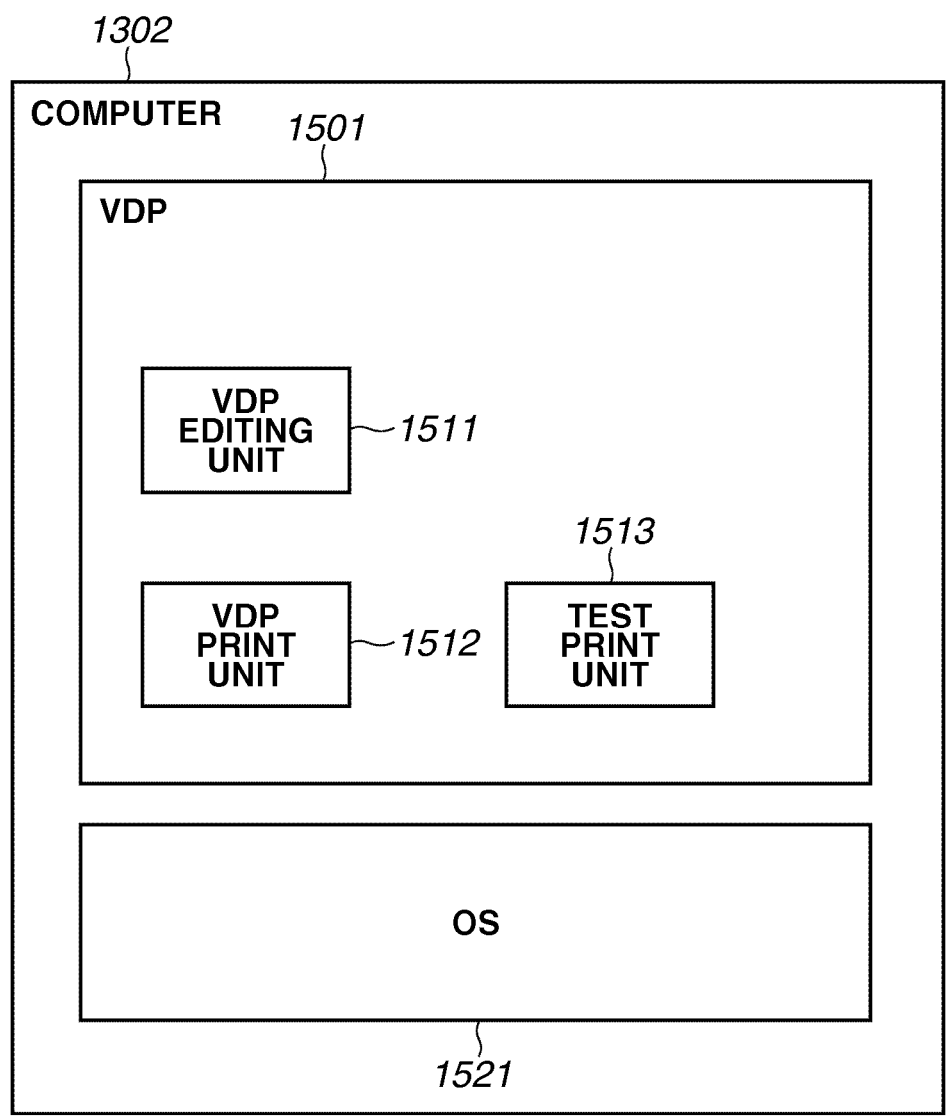
FIG. 15 is a block diagram illustrating the software configuration of the client PC illustrated in FIG. 13.

FIG. 15 is a software function block diagram of the client PC 1302 in FIG. 13 to which the present invention can be applied.

Each software illustrated in FIG. 15 is stored in any of the ROM 1402, the RAM 1403, and the HDD 1404 of the client PC 1302 and executed by the CPU 1401.

An operating system (OS) 1521 is a basic software of the client PC 1302. A VDP application 1501 is application software operating on the OS 1521.

The VDP application 1501 includes a VDP editing unit 1511 for editing each record and print arrangement of VDP, a VDP print unit 1512 for actually printing the generated VDP job, and a test print unit 1513 for executing a test print of the VDP.

The test print of the VDP application 1501 is described below.

The VDP application 1501 in which an instruction for the VDP test print from the user is executed by the CPU 1401 executes the test print unit 1513. The processing illustrated in FIGS. 7 to 12 in the first exemplary embodiment is similar to the processing except the following points described below, so that the processing is not described in particular. What is different between the VDP test print described here and that in FIG. 7 is in the points that the VDP test print is executed by the VDP application 1501 executed by the CPU 1401 and that the print processing of the extracted record in step S719 is the transmission of print job to the image forming apparatus 1301.

Thus, the VDP application 1501 can realize the VDP test print. Although the above exemplary embodiment describes an example in which the extracted record is actually printed, a preview screen of the record extracted on the screen of the client PC may be displayed instead of being actually printed.

According to the present invention, an effective test print can be performed using records fewer in number than all records of the VDP.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-247864 filed Nov. 4, 2010, which is hereby incorporated by reference herein in its entirety.

What is claimed is:

1. An image forming apparatus comprising:
   a reception unit configured to receive a variable data printing VDP job including a plurality of records;
   an extraction unit configured to extract records from the plurality of records by deleting items in which different values are set to all records among the items which are set to the plurality of records included in the VDP job and used for printing and by combining records which have a same combination of values set to remaining items;
   an instruction unit configured to receive a test print instruction for a test print; and
   a printing unit configured to print the records which the extraction unit extracts according to the test print instruction.

2. The image forming apparatus according to claim 1, further comprising a number-of-records specifying unit configured to specify a number of records to be test-printed by the printing unit,
   wherein the printing unit prints the records, a number of which is equal to the number of records specified by the number-of-records specifying unit, in descending order of a number of times of appearance of the records having combinations of values set to each item of a specific record extracted in all records included in the VDP job among the records extracted by the extraction unit.

3. The image forming apparatus according to claim 2, further comprising a cover ratio acquisition unit configured to acquire a VDP cover ratio being a ratio in which combinations of the records to be printed cover all records included in the VDP job when the records having a number of records is specified by the number-of-records specifying unit are test-printed according to an appearance rate of the records having combinations of values set to each item of the specific record extracted in all records included in the VDP job.

4. The image forming apparatus according to claim 3, further comprising:
a cover ratio specifying unit configured to specify the VDP cover ratio; and
a number-of-records acquisition unit configured to acquire a number of records to be printed in a case where the test print is performed to satisfy the VDP cover ratio specified by the cover ratio specifying unit;
wherein the number-of-records specifying unit specifies the number of records acquired by the number-of-records acquisition unit to the number of records to be test-printed by the printing unit.

5. The image forming apparatus according to claim 1, wherein the printing unit prints information indicating which record included in the VDP job has a same combination as a record of the records to be test-printed on a print product of the record to be test-printed.

6. The image forming apparatus according to claim 1, wherein an item used for the print includes at least one of an image object included in the VDP job and a paper type.

7. An information processing apparatus comprising:
an extraction unit configured to extract records for a test print by deleting items in which different values are set to all records among the items which are set to a plurality of records included in a variable data printing VDP job and used for printing and by combining records which have a same combination of values set to remaining items; and
a control unit configured to cause an image forming apparatus to print the records which the extraction unit extracts.

8. An image processing method comprising:
extracting specific records for a test print by deleting items in which different values are set to all records among the items which are set to a plurality of records included in a variable data printing VDP job and used for printing and by combining records which have a same combination of values set to remaining items; and
printing the specific records according to a test print instruction.

9. The image processing method according to claim 8, further comprising specifying a number of records to be test-printed,
wherein the specific records, a number of which is equal to the specified number of records, are printed in descending order of a number of times of appearance of the specific records having combinations of values set to each item of a specific record extracted in all records included in the VDP job among the extracted specific records.

10. The image processing method according to claim 9, further comprising acquiring a VDP cover ratio being a ratio in which combinations of the specific records to be printed cover all records included in the VDP job when the specific records whose specified number of records are test-printed according to an appearance rate of the specific records having combinations of values set to each item of the specific records extracted in all records included in the VDP job.

11. The image processing method according to claim 10, further comprising:
specifying the VDP cover ratio;
acquiring a number of records to be printed in a case where the test print is performed to satisfy the specified VDP cover ratio; and
specifying the acquired number of records to the number of records to be test-printed.

12. The image processing method according to claim 8, further comprising printing information indicating which record included in the VDP job has a same combination as a record of the specific records to be test-printed on a print product of the record to be test-printed.

13. The image processing method according to claim 8, wherein an item used for the printing includes at least one of an image object included in the VDP job and a paper type.

14. A non-transitory computer-readable storage medium storing a program, which when executed by a computer, causes the computer to perform an image processing method comprising:
extracting specific records for a test print by deleting items in which different values are set to all records among the items which are set to a plurality of records included in a variable data printing VDP job and used for printing and by combining records which have a same combination of values set to remaining items; and
printing the specific records according to a test print instruction.

15. An image forming apparatus comprising:
a reception unit configured to receive a VDP job including a plurality of records;
a storage unit configured to store a combination of values of records for a test print obtained by deleting items in which different values are set to all records among the items which are set to the plurality of records included in the VDP job and used for printing and by combining records which have a same combination of values set to remaining items; and
a printing unit configured to print the records for a test print based on the combination of values stored by the storage unit.

16. An image forming method comprising:
receiving a VDP job including a plurality of records;
storing a specific combination of values of records targeted for a test print obtained by deleting items in which different values are set to all records among the items which are set to the plurality of records included in the VDP job and used for printing are deleted and by combining records which have a same combination of values set to remaining items; and
printing the records targeted based on the specific combination.

17. A non-transitory computer-readable storage medium storing a program which when executed by a computer causes the computer to perform a method comprising:
receiving a VDP job including a plurality of records;
storing a specific combination of values of records targeted for a test print obtained by deleting items in which different values are set in all records among the items which are set to the plurality of records included in the VDP job and used for printing are deleted and by combining records which have a same combination of values set to remaining items; and
printing the records targeted based on the specific combination.

* * * * *